United States Patent
Rettenmeier

(10) Patent No.: US 12,515,630 B2
(45) Date of Patent: Jan. 6, 2026

(54) METHOD FOR CONTROLLING A HYDRAULIC BRAKE SYSTEM IN A VEHICLE

(71) Applicant: Robert Bosch GmbH, Stuttgart (DE)

(72) Inventor: Bernhard Rettenmeier, Freiberg am Neckar (DE)

(73) Assignee: Robert Bosch GmbH, Stuttgart (DE)

(*) Notice: Subject to any disclaimer, the term of this patent is extended or adjusted under 35 U.S.C. 154(b) by 1011 days.

(21) Appl. No.: 17/618,321

(22) PCT Filed: Jun. 10, 2020

(86) PCT No.: PCT/EP2020/066067
§ 371 (c)(1),
(2) Date: Dec. 10, 2021

(87) PCT Pub. No.: WO2021/018456
PCT Pub. Date: Feb. 4, 2021

(65) Prior Publication Data
US 2022/0379863 A1    Dec. 1, 2022

(30) Foreign Application Priority Data
Jul. 29, 2019  (DE) .................... 10 2019 211 236.6

(51) Int. Cl.
*B60T 7/12* (2006.01)
*B60T 8/1755* (2006.01)
(Continued)

(52) U.S. Cl.
CPC ............ *B60T 13/686* (2013.01); *B60T 7/122* (2013.01); *B60T 8/1755* (2013.01); *B60T 8/26* (2013.01);
(Continued)

(58) Field of Classification Search
CPC ........ B60T 7/122; B60T 13/58; B60T 13/741; B60T 13/745; B60T 2201/06
See application file for complete search history.

(56) References Cited

U.S. PATENT DOCUMENTS 6,019,442 A * 2/2000 Zechmann ............ B60T 8/1766
303/155
6,422,663 B1 * 7/2002 Siepker ..................... B60T 8/26
188/DIG. 1
(Continued)

FOREIGN PATENT DOCUMENTS

CN    104837692 A    8/2015
CN    110035935 A    7/2019
(Continued)

OTHER PUBLICATIONS

International Search Report corresponding to PCT Application No. PCT/EP2020/066067, mailed Sep. 25, 2020 (German and English language document) (5 pages).

*Primary Examiner* — Bradley T King
(74) *Attorney, Agent, or Firm* — Maginot, Moore & Beck LLP

(57) ABSTRACT

In a method for controlling a hydraulic brake system in a vehicle, wherein the hydraulic brake system is equipped with a hydraulic pump, the hydraulic pump is activated to hold the vehicle at rest and brake fluid is conveyed via open inlet valves to the wheel braking device of a first vehicle axle. The inlet valves on wheel braking devices of a second vehicle axle are at least partially open in response to a change in the brake pressure requirement in the brake system, and at the same time the outlet valves on said wheel braking devices remain closed while the vehicle is being held at rest.

19 Claims, 2 Drawing Sheets

(51) Int. Cl.
*B60T 8/26* (2006.01)
*B60T 13/14* (2006.01)
*B60T 13/58* (2006.01)
*B60T 13/68* (2006.01)

(52) U.S. Cl.
CPC .......... *B60T 13/145* (2013.01); *B60T 13/588* (2013.01); *B60T 2270/30* (2013.01)

(56) References Cited

U.S. PATENT DOCUMENTS

| | | | |
|---|---|---|---|
| 6,814,414 B1 * | 11/2004 | Schmitt ................... | B60T 8/172 |
| | | | 303/9.62 |
| 10,933,846 B2 * | 3/2021 | Kinder ..................... | B60T 13/74 |
| 2006/0186731 A1 * | 8/2006 | Bach ....................... | B60T 7/104 |
| | | | 303/191 |
| 2006/0186732 A1 * | 8/2006 | Saewe .................... | B60T 13/74 |
| | | | 303/9.62 |
| 2006/0220447 A1 | 10/2006 | Giers | |
| 2013/0226426 A1 * | 8/2013 | Baehrle-Miller ..... | B60T 13/588 |
| | | | 701/70 |
| 2020/0031354 A1 * | 1/2020 | Haerdtl .................. | F16H 59/54 |
| 2021/0129817 A1 * | 5/2021 | Michels ............... | B60T 8/1755 |

FOREIGN PATENT DOCUMENTS

| | | |
|---|---|---|
| DE | 10 2013 217 106 A1 | 3/2015 |
| DE | 10 2016 215 759 A1 | 3/2018 |
| DE | 10 2017 209 617 A1 | 12/2018 |
| WO | 2004/089713 A1 | 10/2004 |
| WO | 2018/108351 A1 | 6/2018 |

* cited by examiner

METHOD FOR CONTROLLING A HYDRAULIC BRAKE SYSTEM IN A VEHICLE

This application is a 35 U.S.C. § 371 National Stage Application of PCT/EP2020/066067, filed on Jun. 10, 2020, which claims the benefit of priority to Serial No. DE 10 2019 211 236.6, filed on Jul. 29, 2019 in Germany, the disclosures of which are incorporated herein by reference in their entirety.

The disclosure relates to a method for controlling a hydraulic brake system in a vehicle in order to hold the vehicle stationary.

BACKGROUND

In WO 2018/108351 A1 there is described a hydraulic brake system in a vehicle having two brake circuits for supplying wheel brake units with hydraulic brake pressure. The brake circuits are connected to a common master brake cylinder, from which, on actuation of the brake pedal, brake fluid is conveyed into the brake circuits. Associated with the master brake cylinder is an electromechanical brake pressure generator, which actuates and assists the master brake cylinder. The brake pressure generator comprises an electric motor, which actuates the master brake cylinder.

In each brake circuit there is a hydraulic pump, which pumps are driven by a common pump motor. The hydraulic pumps are part of an electronic stability program, via which automatic intervention in the brake system can be carried out in order to stabilize the vehicle.

SUMMARY

The method according to the disclosure relates to the control of a hydraulic brake system in a vehicle, for holding the vehicle stationary. The hydraulic brake system has at least one hydraulic pump for generating hydraulic brake pressure in the brake fluid of the brake system, wherein, for holding the vehicle stationary, the hydraulic pump is activated and the brake fluid is conducted via open inlet valves to wheel brake devices of a first vehicle axle. This is in particular the rear axle of the vehicle, which has a wheel brake device at each of the left and right rear wheels. For holding the vehicle stationary, the increased brake pressure generated by the hydraulic pump is applied to the wheel brake devices when the inlet valves are open.

By contrast, the inlet valves at the wheel brake devices of the second and optionally further vehicle axle, in particular the front axle of the vehicle, can be closed, but they are opened in the event that there is a changed brake pressure demand in the brake system while the vehicle is being held stationary. Likewise, the outlet valves at the wheel brake devices of this vehicle axle remain closed for the period of time during which the vehicle is held stationary.

Various advantages are achieved with this method. If, for example, the driver actuates the brake pedal while the vehicle is held stationary, a changed brake pressure demand in the brake system is produced, wherein the increased brake pressure is supplied to the wheel brake devices of the second vehicle axle via the open inlet valves. As a result, on the one hand an increased brake force is generated at the further vehicle axle, on the other hand a softer brake feel in the brake pedal is generated.

In addition, switching noise, which can occur on opening and closing of brake valves, is avoided. The transfer of brake fluid from a master brake cylinder of the hydraulic brake system to the wheel brake devices at the second vehicle axle leads to a pressure reduction in the master brake cylinder, which is generally equalized by a brake pressure regulating unit in the hydraulic brake system. In combination with a further regulating system which regulates the position of the inlet and outlet valves in the wheel brake devices at the second vehicle axle, this can lead to an oscillation in the brake fluid of the brake system and result in repeated actuation of the inlet and outlet valves.

In the method according to the disclosure, such oscillations and switching operations in the brake valves of the wheel brake devices at the second vehicle axle are avoided. At least as long as the vehicle is held stationary, the inlet valves at the wheel brake devices of the second vehicle axle remain open at least temporarily and the outlet valves remain closed, so that repeated opening and closing operations at these brake valves are avoided. The pressure drop in the master brake cylinder can be equalized, at the same time the brake pressure in the wheel brake devices of the second vehicle axle is matched to the pressure in the master brake cylinder, so that an additional brake force is generated.

This embodiment allows different regulating systems in the hydraulic brake system to work together, and conflicting behavior of the different regulating systems is avoided. On the one hand, a target pressure is established in the master brake cylinder of the brake system via a pressure regulator. On the other hand, via a further pressure regulator, which controls the opening and closing of the inlet and outlet valves at the wheel brake devices of the second vehicle axle, the hydraulic brake pressure measured in the master brake cylinder is also established in the wheel brake devices of the second vehicle axle. Owing to a different temporal system behavior—the pressure regulator controlling the inlet and outlet valves responds more quickly than the pressure regulator controlling the brake pressure in the master brake cylinder—the above-described noise generation can occur in the prior art as a result of the high actuation of the inlet and outlet valves, and the pressure pulsations in the brake circuits additionally occur. By means of the embodiment according to the disclosure with the at least temporary opening of the inlet valves at the wheel brake devices of the second vehicle axle and closing of the outlet valves at those wheel brake devices, pressure pulsations in the brake system are avoided.

The outlet valves at the wheel brake devices of the second vehicle axle remain closed for the period during which the vehicle is held stationary. The inlet valves at the wheel brake devices of the second vehicle axle can remain open as long as the vehicle is held stationary. It can, however, be advantageous to limit the period of time for which the inlet valves at the wheel brake devices of the second vehicle axle are open and to close the inlet valves as soon as the brake pressure in the wheel brake devices of the second vehicle axle has reached a maximum pressure. This maximum pressure corresponds in particular to the current brake pressure in the master brake cylinder. In this manner it is ensured that a brake pressure is established in the wheel brake devices of the second vehicle axle, for example on actuation of the brake pedal by the driver, that corresponds to the brake pressure established in the master brake cylinder. If this brake pressure level is reached, the inlet valves at the wheel brake devices of the second vehicle axle can be closed.

The mentioned method relates on the one hand to holding the vehicle stationary by conducting the brake pressure via the open inlet valves to the wheel brake devices of the first vehicle axle, and on the other hand to a changing brake pressure demand while the vehicle is being held stationary. This change in the brake pressure demand is generated either via an actuation of the brake pedal by the driver or via an additional brake pressure generator in the brake system, which in particular is configured independently of the hydraulic pump, which is activated in order to hold the vehicle stationary. In this embodiment, the hydraulic brake system accordingly has at least two brake pressure generating units.

The brake pressure generator which is configured as a separate structural unit and independently of the hydraulic pump is, for example, an iBooster, which forms a brake force booster which actuates the master brake cylinder of the brake system by means of an electric motor and optionally a gear unit.

The brake pressure generator can be used to boost a brake demand which the driver specifies by actuation of the brake pedal. The brake pressure generator can, however, also be activated independently of a pedal actuation by the driver, for example via a vehicle regulating system or brake pressure regulating system, for example in order to perform an autonomous driving intervention.

Holding of the vehicle stationary takes place either within the context of a parking operation with the vehicle held stationary for a prolonged period of time or for only a short time, for example within the context of a hill start assist.

In the case of manual actuation of the brake pedal by the driver and holding of the vehicle stationary, brake fluid is transferred via the open inlet valves at the wheel brake devices of the second vehicle axle into those wheel brake devices, whereby a soft, yielding brake pedal behavior is achieved.

According to yet a further advantageous embodiment, the method is used in hydraulic brake systems which are equipped with an additional electromechanical brake mechanism which can be used as a parking brake. The electromechanical brake mechanism comprises at least one electric brake motor which, in order to generate brake force, displaces a brake piston towards a brake disk. While the vehicle is stationary, a brake pressure is generated in the method according to the disclosure via the hydraulic pump, which brake pressure is conducted via the open inlet valves to the wheel brake devices of the first vehicle axle, so that, in addition to the electromechanical brake force, a hydraulic brake force is also generated at those wheel brake devices.

The hydraulic pump is, for example, an ESP pump (electronic stability program).

The disclosure relates further to a control unit which serves to control the adjustable components of the hydraulic brake system and optionally also the electromechanical brake mechanism. In the control unit, the method steps described above are carried out, or the components of the brake system are controlled to perform the method steps.

The disclosure relates also to a hydraulic brake system in a vehicle having an above-described control unit. The brake system can optionally be equipped with an electromechanical brake mechanism having at least one electric brake motor. Advantageously, the two wheel brake devices of the first vehicle axle are each equipped with an electromechanical brake mechanism, but not the wheel brake devices of the second vehicle axle.

The disclosure relates additionally to a computer program product having a program code which is designed to perform the above-described method steps. The computer program product runs in an above-described control unit.

BRIEF DESCRIPTION OF THE DRAWINGS

Further advantages and advantageous embodiments follow from the further disclosure, the description of the figures, and the drawings, in which.

DETAILED DESCRIPTION

Figure 1:
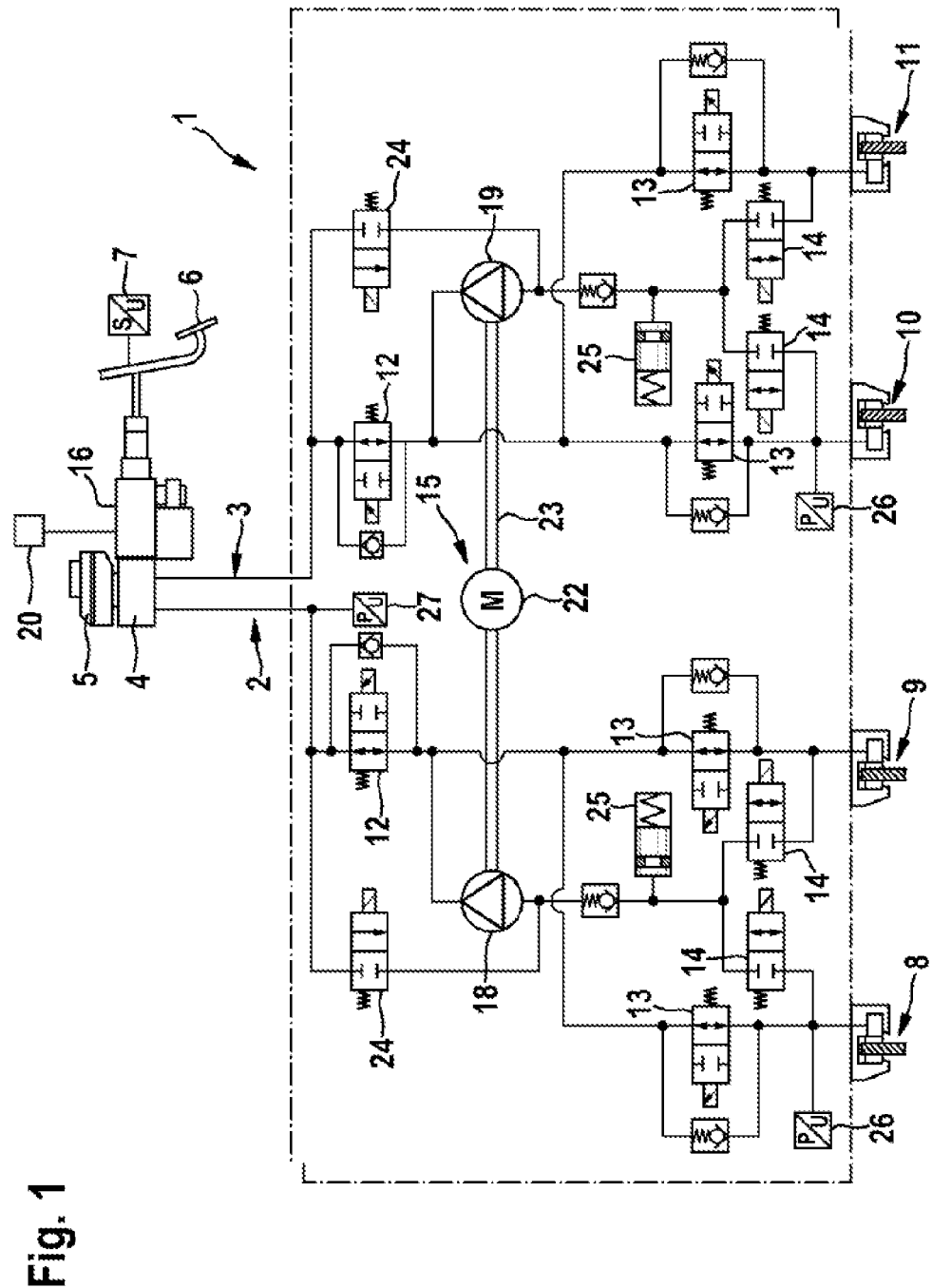
FIG. 1 is a hydraulic circuit diagram of a brake system in a vehicle having two brake circuits.

In the figures, identical components are provided with identical reference numerals.

The hydraulic brake system, in a vehicle, shown in the hydraulic circuit diagram according to FIG. 1 has two brake circuits 2 and 3 arranged crosswise. The first brake circuit 2 and the second brake circuit 3 serve to supply hydraulic brake fluid to wheel brake devices 8 and 9 at the right rear and left front wheels and to wheel brake devices 10 and 11 at the front right and rear left wheels, respectively. The two brake circuits 2, 3 are connected to a common master brake cylinder 4, which is supplied with brake fluid via a brake fluid supply container 5. The master brake cylinder 4 is actuated by the driver via the brake pedal 6, the pedal travel exerted by the driver is measured via a pedal travel sensor 7. Between the brake pedal 6 and the master brake cylinder 4 there is an electromechanical brake pressure generator 16, which comprises, for example, an electric motor which actuates the master brake cylinder 4 preferably via a gear unit (iBooster).

In each brake circuit 2, 3 there is arranged a changeover valve 12, which is located in the flow path between the master brake cylinder and the respective wheel brake devices 8 and 9 or 10 and 11. The changeover valves 12 are open in their unenergized basic position. Associated with each changeover valve 12 is a check valve connected in parallel, through which flow can take place in the direction towards the respective wheel brake devices.

Between the changeover valves 12 and the respective wheel brake devices 8, 9 or 10, 11 there are inlet valves 13 with which there are associated check valves through which flow can take place in the opposite direction, that is to say from the wheel brake devices in the direction towards the master brake cylinder. The inlet valves 13 at the front and rear wheels of the vehicle are normally open.

Associated with each wheel brake device 8, 9 or 10, 11 is an outlet valve 14, which is normally closed. The outlet valves 14 are each connected to the intake side of a pump unit 15, which has a pump 18 and 19 in each brake circuit 2, 3. Associated with the pump unit is a common electric drive or pump motor 22, which actuates the two pumps 18 and 19 via a shaft 23. The discharge side of the pump 18 or 19 is connected to a line portion between the changeover valve 12 and the two inlet valves 13 for each brake circuit.

The intake sides of the pumps 18 and 19 are each connected to a main or high-pressure switching valve 24, which is hydraulically connected to the master brake cylinder 4. In the case of a driving-dynamics regulating intervention, the main switching valves 24, which are closed in the unenergized state, can be opened for a rapid brake pressure build-up, so that the pumps 18 and 19 draw in hydraulic fluid directly from the master brake cylinder 4. This brake pressure build-up can be carried out independently of an actuation of the brake system by the driver. The pump unit 15 with the two individual pumps 18 and 19, the electric pump motor 22 and the shaft 23 is part of a driver assist system and forms an electronic stability program (ESP system), which is activated in particular in order to stabilize the vehicle. The two individual pumps 18 and 19 accordingly form ESP pumps.

Between the outlet valves 14 and the intake side of the pumps 18 and 19 there is, for each brake circuit 2, 3, a hydraulic accumulator 25, which serves to intermediately store brake fluid which is discharged from the wheel brake units 8, 9 or 10, 11 during a driving-dynamics intervention through the outlet valves 14. Associated with each hydraulic accumulator 25 is a check valve which opens in the direction towards the intake sides of the pumps 18, 19.

For pressure measurement, there is in each brake circuit 2, 3, in the region of the wheel brake devices 8, 9 or 10, 11, a pressure sensor 26. A further pressure sensor 27 is arranged in the brake circuit 2 adjacent to the master brake cylinder 4.

The pressure sensors 26 may optionally be omitted.

The brake system 1 is equipped with at least one control unit 20, in which control signals for controlling the components of the brake system, such as valves, pumps and brake pressure generator, are generated. The iBooster and the ESP system optionally each have their own control unit.

Figure 2:
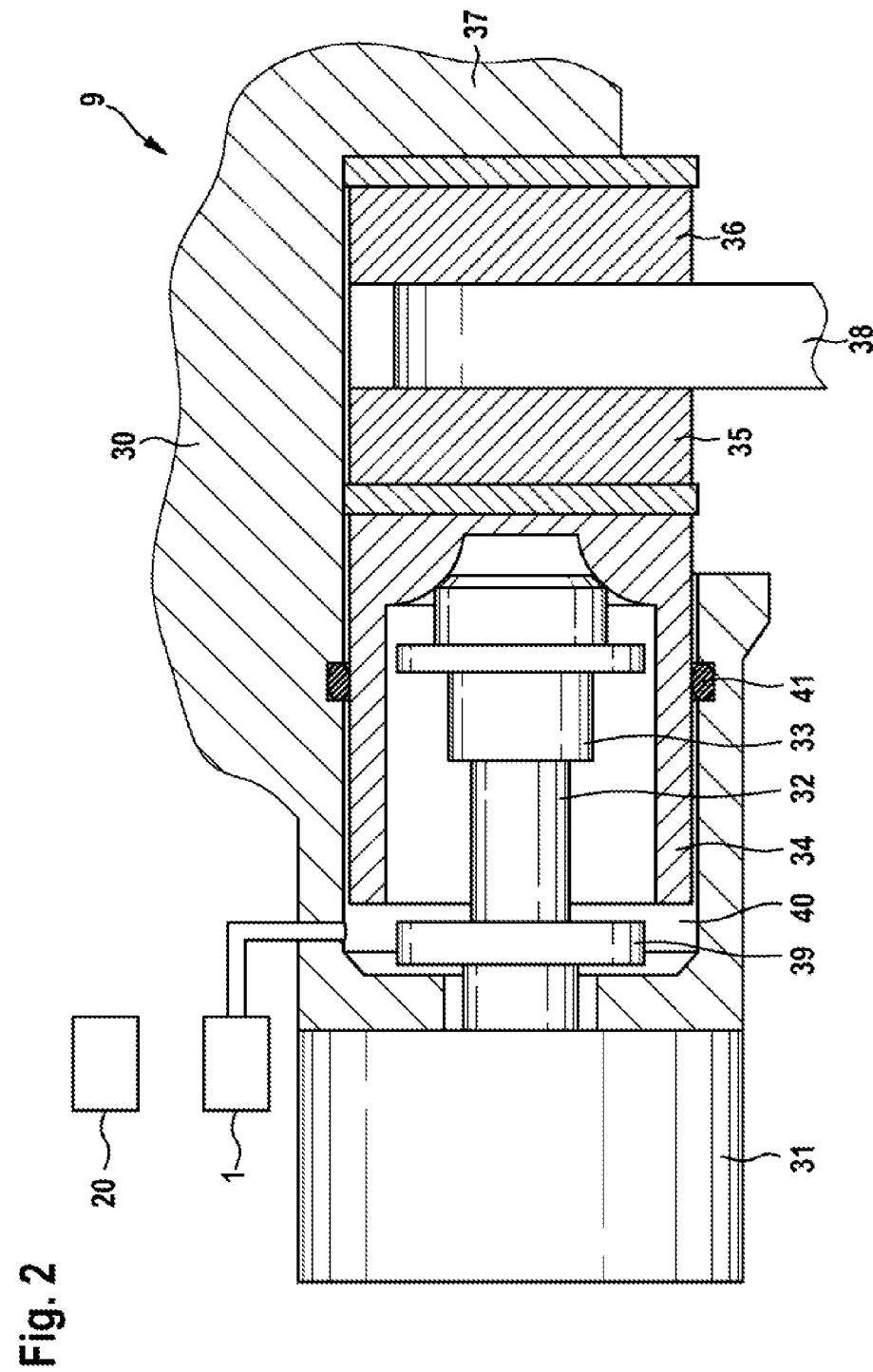
FIG. 2 shows a section through a wheel brake device which is equipped with an electromechanical brake mechanism.

In FIG. 2, the wheel brake device 9 that is arranged at a wheel on the rear axle of the vehicle is shown in detail. The wheel brake device 9 is part of the hydraulic brake system 1 and is supplied with brake fluid 40 from the rear axle brake circuit. The wheel brake device 9 additionally has an electromechanical brake mechanism, which is preferably used as a parking brake for holding a vehicle stationary, but can also be used when the vehicle is moving, in particular at relatively low vehicle speeds below a speed limit value, for decelerating the vehicle. The electromechanical brake mechanism can be used both to hold the vehicle stationary for a prolonged period during parking, and to hold the vehicle stationary for a short time, for example as a launch assist. Advantageously, the two wheel brake devices 8 and 11 on the rear axle are each equipped with an electromechanical brake mechanism, but not the two wheel brake devices 9 and 10 on the front axle.

The electromechanical brake mechanism comprises a caliper unit 30 having a caliper 37 which engages over a brake disk 38. As the actuating element, the brake mechanism has a direct current electric motor as a brake motor 39, the rotor shaft of which drives in rotation a spindle 32 on which a spindle nut 33 is mounted in a rotationally fixed manner. On rotation of the spindle 32, the spindle nut 33 is displaced axially. The spindle nut 33 moves inside a brake piston 34, which carries a brake lining 35, which is pressed by the brake piston 34 against the brake disk 38. On the opposite side of the brake disk 38 there is a further brake lining 36, which is held fixedly on the caliper 37. The brake piston 34 is sealed on its outer side in a pressure-tight manner relative to the receiving housing via a circumferential sealing ring 41.

Inside the brake piston 34, the spindle nut 33 can move, in the case of a rotary movement of the spindle 32, axially forwards in the direction towards the brake disk 38 or, in the case of an opposite rotary movement of the spindle 32, axially backwards until it reaches a stop 39. In order to generate a clamping force, the spindle nut 33 acts on the inner face of the brake piston 34, whereby the brake piston 34, mounted axially displaceably in the brake mechanism, with the brake lining 35 is pressed against the facing end face of the brake disk 38.

For the hydraulic brake force, the hydraulic pressure of the brake fluid 40 from the hydraulic vehicle brake 1 acts on the brake piston 34. The hydraulic pressure can also be active in a supporting manner while the vehicle is stationary on actuation of the electromechanical brake mechanism, so that the total brake force is composed of the component provided electromotively and the hydraulic component. While the vehicle is being driven, either only the hydraulic vehicle brake or both the hydraulic vehicle brake and the electromechanical brake mechanism or only the electromechanical brake mechanism is active, in order to generate brake force. The control signals for controlling both the adjustable components of the hydraulic vehicle brake 1 and the electromechanical wheel brake device 9 are generated in the control unit 20.

In order to achieve a subjectively pleasant brake feel and, objectively, a reduction of the noise generation and a reduction or avoidance of pulsations in the brake fluid when the vehicle is held stationary, various measures are carried out at the same time. Holding the vehicle stationary takes place on the one hand via actuation of the electromechanical brake mechanism, in that the electric brake motors at the wheel brake devices 8 and 11 of the rear axle are controlled and the brake linings 35 and 36 are applied to the brake disk 38. On the other hand, in order to support and increase the brake force at the wheel brake devices of the rear axle, the ESP pumps 18 and 19 are also actuated, so that brake pressure flows via the open inlet valves 13 to wheel brake devices 8 and 11 of the rear axle.

If the brake pressure demand in the brake system 1 changes during this, for example as a result of actuation of the brake pedal 6 or via activation of the brake pressure generator or iBooster 16, the inlet valves 13 at the wheel brake devices 9, 10 of the front axle are opened, or kept open, and at the same time the outlet valves 14 at those wheel brake devices 9, 10 are closed, or kept closed. The brake pressure can then flow from the master brake cylinder 4 via the open inlet valves 13 to the wheel brake devices 9 and 10 of the front axle, so that the same brake pressure is established in these wheel brake devices 9 and 10 as in the master brake cylinder. The brake pressure in the wheel brake devices 9 and 10 of the front axle increases dynamically to the brake pressure of the master brake cylinder 4. Once the brake pressure of the master brake cylinder 4 has been reached, the inlet valves 13 at the wheel brake devices 9 and 10 can be closed.

Overall, a stabilization in the brake fluid of the brake system 1 is achieved by these measures, since frequent opening and closing of the inlet valves 13 and outlet valves at the wheel brake devices 9 and 10 of the front axle is not required. The brake pressure generator or iBooster 16, which responds more slowly than the opening and closing of the valves 13, 14, is able to establish a desired pressure in the master brake cylinder 16 without the risk of pressure oscillation in the brake circuits, caused by the interaction on actuation of the iBooster 16 and rapid opening and closing of the valves.

As soon as the vehicle is no longer to be held stationary, all the inlet valves 13 and outlet valves 14 at the wheel brake devices 8 to 11 can be actuated in such a manner that a driver's braking intention or a brake demand of a regulating system can be implemented in the desired manner.

The invention claimed is:

1. A method for controlling a hydraulic brake system in a vehicle, wherein the hydraulic brake system is equipped with a hydraulic pump configured to generate hydraulic brake pressure, comprising:

activating the hydraulic pump to hold the vehicle stationary;

conducting brake fluid via open inlet valves to wheel brake devices of a first vehicle axle using the activated hydraulic pump while inlet valves at wheel brake devices of a second vehicle axle are closed;

opening the inlet valves at the wheel brake devices of the second vehicle axle at least temporarily in response to a change in brake pressure demand in the brake system, wherein outlet valves at the wheel brake devices of the second vehicle axle remain closed for a period of time during which the vehicle is held stationary; and closing the inlet valves at the wheel brake devices of the second vehicle axle after the opening and while the vehicle is held stationary in response to the brake pressure in the wheel brake devices of the second vehicle axle reaching a maximum pressure.

2. The method as claimed in claim 1, wherein the changed brake pressure demand in the brake system is produced via actuation of a brake pedal of the vehicle by a driver of the vehicle.

3. The method as claimed in claim 1, wherein the changed brake pressure demand in the brake system is produced via a controllable brake pressure generator configured separately from the hydraulic pump.

4. The method as claimed in claim 3, wherein the controllable brake pressure generator configured separately from the hydraulic pump comprises a brake force booster configured to actuate a master brake cylinder of the brake system using an electric motor.

5. The method as claimed in claim 1, wherein the hydraulic pump remains activated while the inlet valves at the wheel brake devices of the second vehicle axle remain open.

6. The method as claimed in claim 1, further comprising:
actuating an electric brake motor of an electromechanical brake mechanism in the wheel brake device of the first vehicle axle while the vehicle is held stationary.

7. The method as claimed in claim 1, wherein the hydraulic pump is an electronic stability program pump.

8. A hydraulic brake system in a vehicle, comprising:
a control unit configured to control adjustable components of the hydraulic brake system to:
activate a hydraulic pump to hold the vehicle stationary,
conduct brake fluid via open inlet valves to wheel brake devices of a first vehicle axle using the activated hydraulic pump while inlet valves at wheel brake devices of a second vehicle axle are closed, and
open the inlet valves at the wheel brake devices of the second vehicle axle at least temporarily in response to a change in brake pressure demand in the brake system,
wherein outlet valves at the wheel brake devices of the second vehicle axle remain closed for a period of time during which the vehicle is held stationary, and
wherein the hydraulic pump remains activated while the inlet valves at the wheel brake devices of the second vehicle axle remain open.

9. The brake system as claimed in claim 8, wherein the brake system comprises an electromechanical brake mechanism having at least one electric brake motor which displaces a brake piston toward a brake disk in order to generate brake force.

10. The brake system as claimed in claim 8, further comprising:
a computer program product having a program code which is run by the control unit to control the adjustable components of the hydraulic brake system.

11. The brake system as claimed in claim 8, wherein after the opening, the inlet valves at the wheel brake devices of the second vehicle axle remain open as long as the vehicle is held stationary.

12. The brake system as claimed in claim 8, further comprising:
closing the inlet valves at the wheel brake devices of the second vehicle axle after the opening and while the vehicle is held stationary in response to the brake pressure in the wheel brake devices of the second vehicle axle reaching a maximum pressure.

13. A method for controlling a hydraulic brake system in a vehicle, wherein the hydraulic brake system is equipped with a hydraulic pump configured to generate hydraulic brake pressure, comprising:
activating the hydraulic pump to hold the vehicle stationary;
conducting brake fluid via open inlet valves to wheel brake devices of a first vehicle axle using the activated hydraulic pump while inlet valves at wheel brake devices of a second vehicle axle are closed; and
opening the inlet valves at the wheel brake devices of the second vehicle axle at least temporarily in response to a change in brake pressure demand in the brake system,
wherein outlet valves at the wheel brake devices of the second vehicle axle remain closed for a period of time during which the vehicle is held stationary, and
wherein the hydraulic pump remains activated while the inlet valves at the wheel brake devices of the second vehicle axle remain open.

14. The method as claimed in claim 13, wherein after the opening, the inlet valves at the wheel brake devices of the second vehicle axle remain open as long as the vehicle is held stationary.

15. The method as claimed in claim 13, wherein the changed brake pressure demand in the brake system is produced via actuation of a brake pedal of the vehicle by a driver of the vehicle.

16. The method as claimed in claim 13, wherein the changed brake pressure demand in the brake system is produced via a controllable brake pressure generator configured separately from the hydraulic pump.

17. The method as claimed in claim 16, wherein the controllable brake pressure generator configured separately from the hydraulic pump comprises a brake force booster configured to actuate a master brake cylinder of the brake system using an electric motor.

18. The method as claimed in claim 13, further comprising:
actuating an electric brake motor of an electromechanical brake mechanism in the wheel brake device of the first vehicle axle while the vehicle is held stationary.

19. The method as claimed in claim 13, wherein the hydraulic pump is an electronic stability program pump.

* * * * *